(12) United States Patent
Sung

(10) Patent No.: US 11,032,623 B1
(45) Date of Patent: Jun. 8, 2021

(54) SUBTITLED IMAGE GENERATION APPARATUS AND METHOD

(71) Applicant: REALTEK SEMICONDUCTOR CORPORATION, Hsinchu (TW)

(72) Inventor: Lien-Hsiang Sung, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/922,081

(22) Filed: Jul. 7, 2020

(30) Foreign Application Priority Data

Apr. 8, 2020 (TW) .................................. 109111816

(51) Int. Cl.
  *H04N 21/488* (2011.01)
  *H04N 21/4722* (2011.01)
  *H04N 21/81* (2011.01)

(52) U.S. Cl.
  CPC ..... *H04N 21/4884* (2013.01); *H04N 21/4722* (2013.01); *H04N 21/8106* (2013.01)

(58) Field of Classification Search
  CPC ........... H04N 21/4884; H04N 21/8106; H04N 21/4722; H04N 5/278; H04N 13/183; H04N 7/141
  See application file for complete search history.

(56) References Cited

U.S. PATENT DOCUMENTS

| | | | |
|---|---|---|---|
| 9,959,872 B2* | 5/2018 | Barreira Avegliano | ...................... G10L 15/26 |
| 2004/0093220 A1* | 5/2004 | Kirby | ...................... H04N 5/278 704/278 |
| 2007/0140656 A1* | 6/2007 | Ergin | .................. H04N 21/4348 386/207 |
| 2007/0222895 A1* | 9/2007 | Yamauchi | .............. H04N 7/012 348/701 |
| 2008/0209482 A1* | 8/2008 | Meek | ....................... H04N 5/04 725/105 |
| 2008/0304571 A1* | 12/2008 | Tsukagoshi | ........ H04N 21/4307 375/240.25 |
| 2010/0265397 A1* | 10/2010 | Dasher | ........... H04N 21/234336 348/468 |

(Continued)

FOREIGN PATENT DOCUMENTS

WO    WO-2004080072 A1 *    9/2004    ............. G10L 15/26

*Primary Examiner* — Fernando Alcon
(74) *Attorney, Agent, or Firm* — WPAT, PC

(57) ABSTRACT

The present invention discloses a subtitled image generation apparatus that includes a subtitle generation circuit, an image delay circuit and an overlaying circuit. The subtitle generation circuit receives audio data to generate a subtitle image pattern. The image delay circuit includes a first delay path having delay buffer circuit, a second delay path having a data amount decreasing circuit, the delay buffer circuit and a data amount restoring circuit, and a control circuit. The control circuit controls the first delay path to store and delay the image data when a data amount of the image data matches a direct-writing condition, and controls the second delay path to decrease the data amount of the image data, to store and delay the image data and to restore the data amount of the image data when the data amount fails to match the direct-writing condition. The overlaying circuit overlays the subtitle image pattern on the image data having a corresponding timing to generate an output subtitled image.

10 Claims, 3 Drawing Sheets

(56) References Cited

U.S. PATENT DOCUMENTS

| | | | |
|---|---|---|---|
| 2013/0201283 A1* | 8/2013 | Broberg | H04N 13/156 348/43 |
| 2016/0295293 A1* | 10/2016 | McLaughlin | H04N 21/4302 |
| 2020/0007947 A1* | 1/2020 | NarayanaMurthy | H04N 21/84 |
| 2020/0066251 A1* | 2/2020 | Kumano | G10L 13/00 |

* cited by examiner

SUBTITLED IMAGE GENERATION APPARATUS AND METHOD

BACKGROUND OF THE INVENTION

1. Field of the Invention

The present invention relates to a subtitled image generation apparatus and a subtitled image generation method.

2. Description of Related Art

In recent times, there has been a lot of progress in the field of multimedia technology. An image playback device often receives and playbacks image data from different sources. For example, a liquid crystal display (LCD) television may receive and playback image data from a hard drive, a DVD player or a multimedia streaming website.

However, not every image source provides subtitles along with the image data. Further, not every image source provides subtitles corresponding to the language that user can understand. Under such a condition, the function that generates subtitles corresponding to the desired language automatically becomes an important feature of an image playback device.

SUMMARY OF THE INVENTION

In consideration of the problem of the prior art, an object of the present invention is to provide a subtitled image generation apparatus and a subtitled image generation method.

The present invention discloses a subtitled image generation apparatus that includes a subtitle generation circuit, an image delay circuit and an overlaying circuit. The subtitle generation circuit is configured to receive audio data to generate a subtitle image pattern according to the audio data. The image delay circuit includes a first delay path, a second delay path and a control circuit. The first delay path has a delay buffer circuit. The second delay path has a data amount decreasing circuit, the delay buffer circuit and a data amount restoring circuit. The control circuit is configured to control the first delay path to store and delay image data when a data amount of the image data matches a direct-writing condition, and control the second delay path to decrease the data amount of the image data, to store and delay the image data and to restore the data amount of the image data when the data amount fails to match the direct-writing condition. The overlaying circuit is configured to overlay the subtitle image pattern on the image data having a corresponding timing to generate an output subtitled image.

The present invention also discloses a subtitled image generation method used in a subtitled image generation apparatus that includes steps outlined below. Audio data is received to generate a subtitle image pattern according to the audio data by a subtitle generation circuit. A first delay path, which is in an image delay circuit and having a delay buffer circuit, is controlled by a control circuit in the image delay circuit to store and delay image data when a data amount of the image data matches a direct-writing condition. A second delay path, which is in an image delay circuit and having a data amount decreasing circuit, the delay buffer circuit and a data amount restoring circuit, is controlled by the control circuit to decrease the data amount of the image data, to store and delay the image data and to restore the data amount of the image data when the data amount fails to match the direct-writing condition. The subtitle image pattern is overlaid on the image data having a corresponding timing to generate an output subtitled image by an overlaying circuit.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a subtitled image generation apparatus and a subtitled image generation method to temporarily store image data during the generation of subtitles based on the processing of the audio data, such that the timing of the image data and the subtitles can be synchronous. Further, the subtitled image generation apparatus and the subtitled image generation method can adjust the data amount of the image data when the data amount does not match a direct-writing condition so that the usage of the storage amount of the delay buffer circuit can be more elastic.

Figure 1:
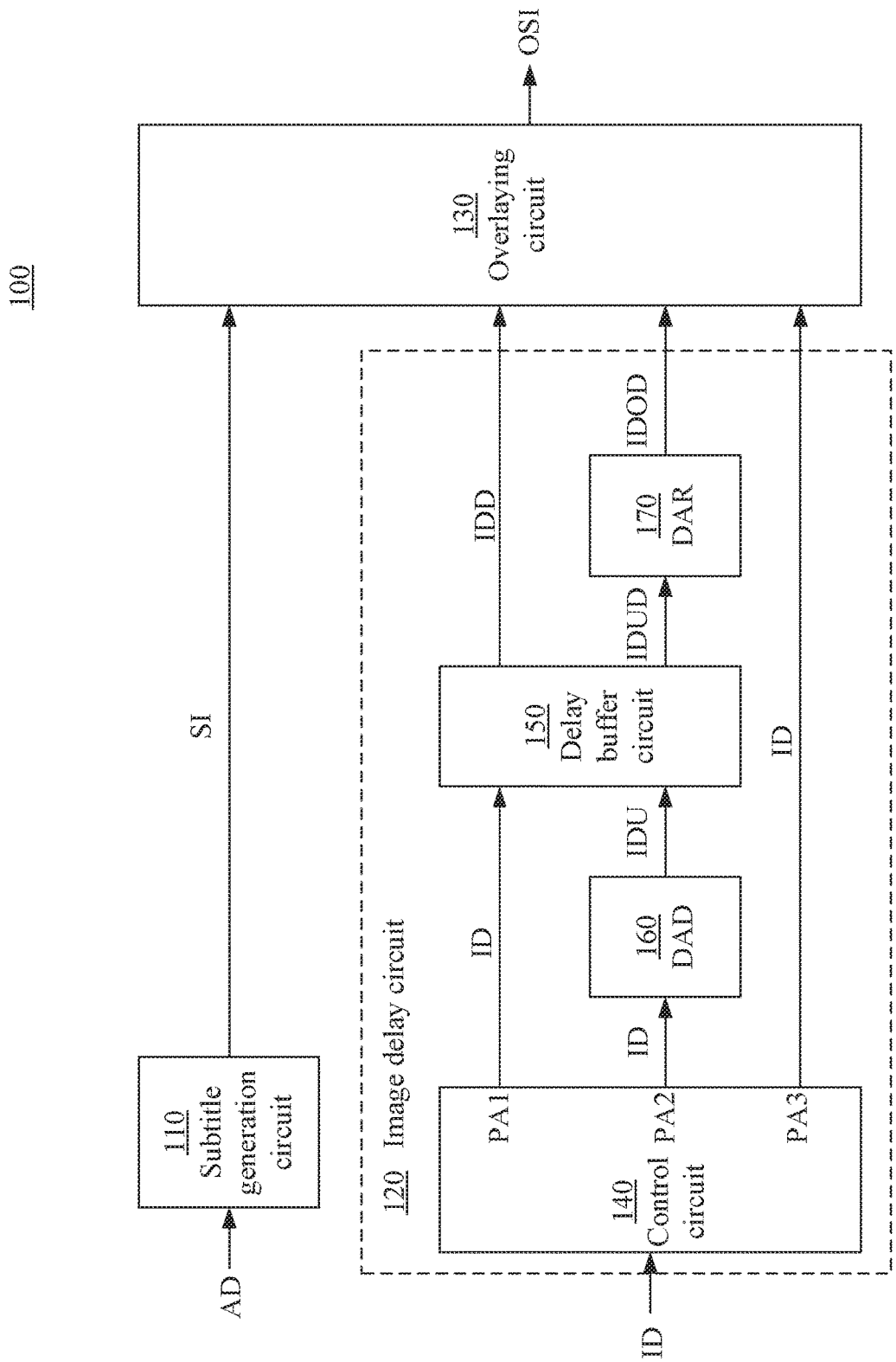
FIG. 1 illustrates a block diagram of a subtitled image generation apparatus according to an embodiment of the present invention.

Reference is now made to FIG. 1. FIG. 1 illustrates a block diagram of a subtitled image generation apparatus 100 according to an embodiment of the present invention. The subtitled image generation apparatus 100 includes a subtitle generation circuit 110, an image delay circuit 120 and an overlaying circuit 130.

The subtitle generation circuit 110 is configured to receive audio data AD to generate a subtitle image pattern SI according to the audio data AD. In an embodiment, the subtitle generation circuit 110 can be such as, but not limited to a circuit that operates software of speech recognition and/or translation, or a circuit that is able to transmit the audio data AD to external software or hardware for speech recognition and/or translation. The subtitle generation circuit 110 is able to generate the subtitle image pattern SI corresponding to a desired language according to the audio data AD.

The image delay circuit 120 includes a first delay path PA1, a second delay path PA2 and a control circuit 140. The first delay path PA1 has a delay buffer circuit 150. The second delay path PA2 has a data amount decreasing circuit 160 (abbreviated as DAD in FIG. 1), the delay buffer circuit 150 and a data amount restoring circuit 170 (abbreviated as DAR in FIG. 1).

The control circuit 140 is configured to receive image data ID, and select one of the first delay path PA1 and the second delay path PA2 according to the data amount of the image data ID, to process the image data ID. The image data ID and the audio data AD can be from the same source, such as but not limited to a DVD play, a hard drive or multimedia streaming website.

When the control circuit 140 selects the first delay path PA1, the image data ID is only processed by the delay buffer circuit 150. The delay buffer circuit 150 is configured to temporarily store the inputted image data ID and generate image data IDD. The delay of the timing of the image data ID is accomplished.

When the control circuit 140 selects the second delay path PA2, the image data ID is processed by the data amount decreasing circuit 160, the delay buffer circuit 150 and the data amount restoring circuit 170.

The data amount decreasing circuit 160 is configured to decrease the data amount of the inputted image data ID. In an embodiment, the data amount decreasing circuit 160 includes such as, but not limited to an encoding circuit, a compression circuit, a down-sizing circuit, an image-abandoning circuit or a combination thereof. The data amount decreasing circuit 160 performs encoding, compression or down-sizing on the image data ID, or abandons at least a frame from the image data ID. As a result, the data amount of the image data ID is decreased to generate image data IDU.

Further, the delay buffer circuit 150 is configured to temporarily store the inputted image data IDU and generate image data IDUD. The delay of the timing of the image data IDU is accomplished.

The data amount restoring circuit 170 is configured to restore the data amount of the image data IDUD. In an embodiment, the data amount restoring circuit 170 includes such as, but not limited to a decoding circuit, a decompression circuit, a size-restoring circuit, an image-interpolating circuit or a combination thereof. The data amount restoring circuit 170 performs decoding, decompression, size-restoring on the image data IDUD, or interpolates at least a frame to the image data IDUD. As a result, the data amount of the image data IDUD having the data amount decreased is restored to generate image data IDOD.

In an embodiment, the image data IDD or IDOD outputted by the image delay circuit 120 can be transmitted to a playback circuit (not illustrated) to be playback.

The determination and selection mechanism of the control circuit 140 is described in further detail in the following paragraphs.

The control circuit 140 is configured to control the first delay path PA1 to store and delay image data ID when the data amount of the image data ID matches a direct-writing condition. Further, the control circuit 140 is configured to control the second delay path PA2 to decrease the data amount of the image data ID, to store and delay the image data ID and to restore the data amount of the image data ID when the data amount fails to match the direct-writing condition.

In an embodiment, the control circuit 140 is configured to determine that the image data ID is a compressed format to further determine that the data amount of the image data ID matches the direct-writing condition.

For example, when the image data ID is a compressed format of such as, but not limited to MPEG or H.264, the control circuit 140 considers that the data amount of the image data ID is already small enough. The control circuit 140 thus selects the first delay path PA1 to directly store and delay the image data ID in the delay buffer circuit 150.

On the contrary, for example, when the image data ID is not a compressed format, the control circuit 140 considers that the data amount of the image data ID is larger. The control circuit 140 thus selects the second delay path PA2 to decrease the data amount of the image data ID by using the data amount decreasing circuit 160, store and delay the data in the delay buffer circuit 150 and restore the data amount by using the data amount restoring circuit 170.

In another embodiment, the control circuit 140 is configured to determine that an image frame size of the image data ID is smaller than a threshold value to further determine that the data amount of the image data ID matches the direct-writing condition.

For example, when the image frame size of the image data ID is smaller than such as, but not limited to 1920x1080, the control circuit 140 considers that the data amount of the image data ID is already small enough. The control circuit 140 thus selects the first delay path PA1 to directly store and delay the image data ID in the delay buffer circuit 150.

On the contrary, for example, when the image frame size of the image data ID is larger than 1920x1080, the control circuit 140 considers that the data amount of the image data ID is larger. The control circuit 140 thus selects the second delay path PA2 to decrease the data amount of the image data ID by using the data amount decreasing circuit 160, store and delay the data in the delay buffer circuit 150 and restore the data amount by using the data amount restoring circuit 170.

It is appreciated that the compressed formats and the image frame size described above are merely an example. In other embodiments, other compressed formats and other image frame sizes can be used to determine whether the data amount of the image data ID is too large.

In an embodiment, the control circuit 140 can determine whether the image data ID is a compressed format and whether the image frame size of the image data ID is smaller than the threshold value simultaneously. The control circuit 140 determines that the data amount of the image data ID matches the direct-writing condition when at least one of the two conditions occurs, and determines that the data amount of the image data ID fails to match the direct-writing condition when both of the conditions do not occur. Further, in other embodiments, the control circuit 140 can perform determination based on other parameters of the image data ID. The present invention is not limited thereto.

The overlaying circuit 130 is configured to overlay the subtitle image pattern SI on the image data IDD or IDOD, delayed by the image delay circuit 120 and having a corresponding timing, to generate an output subtitled image OSI. In an embodiment, the output subtitled image OSI can be transmitted to such as, but not limited to a display panel to be displayed.

By using the method described above, the subtitled image generation apparatus of the present invention can temporarily store image data during the generation of subtitles based on the processing of the audio data such that the timing of the image data and the subtitles can be synchronous. Further, the subtitled image generation apparatus of the present invention can determine whether the data amount of the image data needs to be adjusted so as to be stored in the delay buffer circuit according to the data amount. The usage of the storage amount of the delay buffer circuit can be more elastic.

In an embodiment, the control circuit 140 is configured to operate the subtitled image generation apparatus 100 under either a subtitle function enabling mode or a subtitle function disabling mode. For example, the control circuit 140 can be controlled by a user, e.g. according to such as, but not limited to a control signal transmitted from a remote controller of the user, to operate the subtitled image generation apparatus 100 under either the subtitle function enabling mode or the subtitle function disabling mode.

As illustrated in FIG. 1, under the subtitle function enabling mode, the control circuit 140 is configured to input the image data ID to the image delay circuit 120 with a frame input rate to be processed through either the first delay path PA1 or the second delay path PA2, and output the image data IDD or IDOD from the image delay circuit 120 with a frame output rate equal to the frame input rate. In a numerical example, the frame input rate can be such as 60 frames per second. As a result, the frame output rate is also 60 frames per second.

Besides, under the subtitle function disabling mode, the control circuit 140 is configured to bypass the image delay circuit 120 to output the image data ID directly with the frame output rate through a transmission path PA3.

However, when the subtitled image generation apparatus 100 switches from the subtitle function disabling mode to the subtitle function enabling mode, a non-continuous playback result may occur in the subsequent circuit due to the storage of the image data after the image delay circuit 120 starts to operate. On the other hand, when the subtitled image generation apparatus 100 switches from the subtitle function enabling mode to the subtitle function disabling mode, an instant speed-up playback result may occur in the subsequent circuit since the image data is not required to be stored and the image delay circuit 120 stops to operate.

Figure 2:
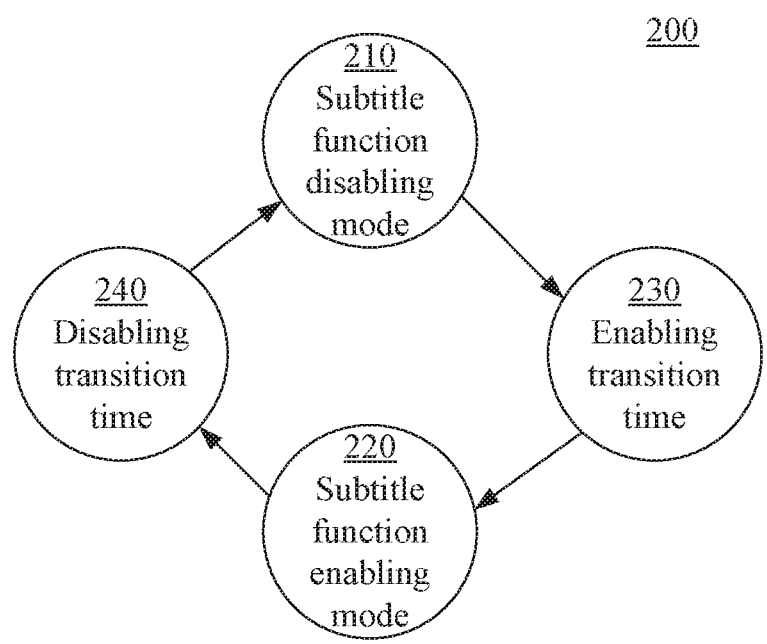
FIG. 2 illustrates a diagram of a finite state machine corresponding to the operation of the subtitled image generation apparatus according to an embodiment of the present invention.

Reference is now made to FIG. 2. FIG. 2 illustrates a diagram of a finite state machine 200 corresponding to the operation of the subtitled image generation apparatus 100 according to an embodiment of the present invention.

As illustrated in FIG. 2, the control circuit 140 is configured to have an enabling transition time 230 of a transition from the subtitle function disabling mode 210 to the subtitle function enabling mode 220. Within the enabling transition time 230, the control circuit 140 inputs the image data ID to the image delay circuit 120 with the frame input rate to be processed and outputs the image data IDD or IDOD from the image delay circuit 120 with a first adjusted frame output rate smaller than the frame input rate.

Within the enabling transition time, the frame input rate is FIN, the first adjusted frame output rate is FOUT and a required delay time length corresponding to the generation of the subtitle image pattern SI from the subtitle generation circuit 110 is DE seconds. A length of the enabling transition time can be expressed as the following equation: (DE×FIN)/(FIN−FOUT).

In a numerical example, within the enabling transition time 230, the control circuit 140 sets the frame input rate of the image delay circuit 120 to be such as 60 frames per second, and sets the first adjusted frame output rate to be 58 frames per second. If a desired delay time length is 1 second, the duration of the enabling transition time 230 is (1×60)/(60−58)=30 seconds. As a result, in the enabling transition time 230, 60 frames are accumulated in the delay buffer circuit 150 of the image delay circuit 120. The total delay time length of 1 second can be accomplished under the condition that the original frame input rate is 60 frames per second.

It is appreciated that the value of the desired delay time length is merely an example. The actual value of the desired delay time length is determined based on the time required for the operation process of the subtitle generation circuit 110 from the reception of the audio data AD to the generation of the subtitle image pattern SI. The present invention is not limited thereto.

On the other hand, the control circuit 140 is configured to have a disabling transition time 240 of a transition from the subtitle function enabling mode 220 to the subtitle function disabling mode 210. Within the disabling transition time 240, the control circuit 140 inputs the image data ID to the image delay circuit 120 with the frame input rate to be processed and output the image data IDD or IDOD from the image delay circuit 120 with a second adjusted frame output rate larger than the frame input rate.

Since no specific timing needs to be satisfied after the subtitle function disabling mode 210, the control circuit 140 can terminate the disabling transition time 240 after a sufficient number of frames are released. Not all the frames stored in the delay buffer circuit 150 needs to be released.

In a numerical example, within the disabling transition time 240, the control circuit 140 sets the frame input rate of the image delay circuit 120 to be such as 60 frames per second, and sets the second adjusted frame output rate to be 62 frames per second.

By disposing the enabling transition time and the disabling transition time described above, the switching of the operation of the subtitled image generation apparatus 100 between the subtitle function disabling mode and the subtitle function enabling mode can be performed smoothly. The non-continuous playback result generated due to the enabling and disabling of the image delay circuit 120 can be avoided.

Figure 3:
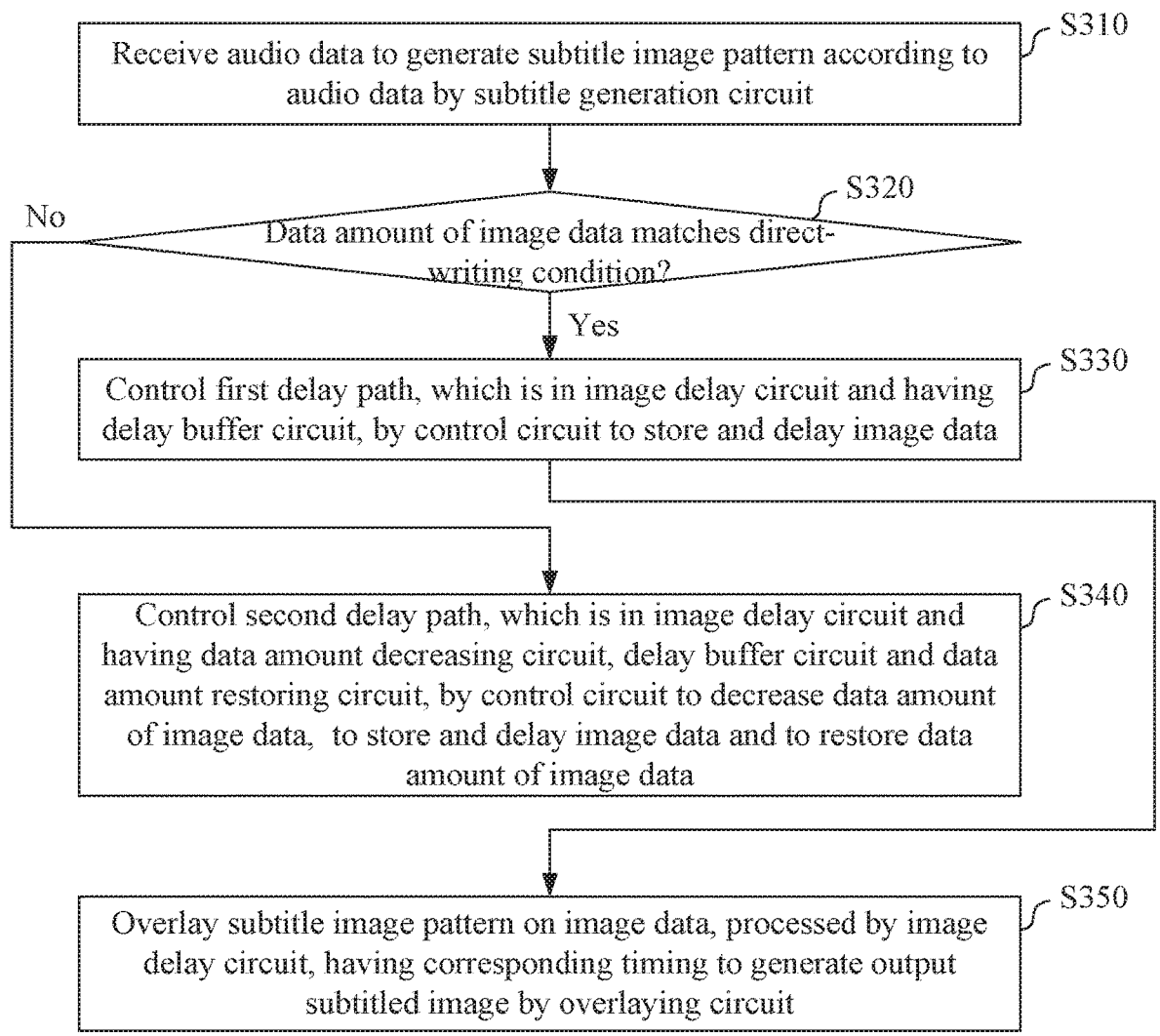
FIG. 3 illustrates a flow chart of a subtitled image generation method according to an embodiment of the present invention.

Reference is now made to FIG. 3. FIG. 3 illustrates a flow chart of a subtitled image generation method 300 according to an embodiment of the present invention.

Besides the apparatus described above, the present invention further discloses the subtitled image generation method 300 that can be used in such as, but not limited to the subtitled image generation apparatus 100 illustrated in FIG. 1. An embodiment of the subtitled image generation method 300 is illustrated in FIG. 3 and includes the steps outlined below.

In step S310, the audio data AD is received to generate a subtitle image pattern SI according to the audio data AD by the subtitle generation circuit 110.

In step S320, whether the data amount of the image data ID matches the direct-writing condition is determined by the control circuit 140 of the image delay circuit 120.

In step S330, the first delay path PA1, which is in the image delay circuit 120 and having the delay buffer circuit 150, is controlled by the control circuit 140 to store and delay image data ID, when the data amount of the image data ID matches the direct-writing condition.

In step S340, the second delay path PA2, which is in the image delay circuit 120 and having the data amount decreasing circuit 160, the delay buffer circuit 150 and the data amount restoring circuit 170, is controlled by the control circuit 140 to decrease the data amount of the image data ID, to store and delay the image data ID and to restore the data amount of the image data ID when the data amount fails to match the direct-writing condition.

In step S350, the subtitle image pattern SI is overlaid on the image data IDD or IDOD having the corresponding timing to generate the output subtitled image OSI by the overlaying circuit 130, wherein the image data IDD and IDOD are respectively processed by the first delay path PA1 and the second delay path PA2 of the image delay circuit 120.

It is appreciated that the embodiments described above are merely an example. In other embodiments, it should be appreciated that many modifications and changes may be made by those of ordinary skill in the art without departing from the spirit of the invention.

In summary, the subtitled image generation apparatus and the subtitled image generation method of the present invention can temporarily store image data during the generation of subtitles based on the processing of the audio data such that the timing of the image data and the subtitles can be synchronous. Further, the subtitled image generation apparatus and the subtitled image generation method can adjust the data amount of the image data when the data amount does not match a direct-writing condition so that the usage of the storage amount of the delay buffer circuit can be more elastic.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A subtitled image generation apparatus, comprising:
    a subtitle generation circuit configured to receive audio data to generate a subtitle image pattern according to the audio data;
    an image delay circuit comprising:
        a first delay path having a delay buffer circuit;
        a second delay path having a data amount decreasing circuit, the delay buffer circuit and a data amount restoring circuit; and
        a control circuit configured to control the first delay path to store and delay image data when a data amount of the image data matches a direct-writing condition, and control the second delay path to decrease the data amount of the image data, to store and delay the image data and to restore the data amount of the image data when the data amount fails to match the direct-writing condition; and
    an overlaying circuit configured to overlay the subtitle image pattern on the image data having corresponding a timing to generate an output subtitled image.

2. The subtitled image generation apparatus of claim 1, wherein the control circuit is configured to determine that the image data is a compressed format or an image frame size of the image data is smaller than a threshold value, to further determine that the data amount of the image data matches the direct-writing condition.

3. The subtitled image generation apparatus of claim 1, wherein the data amount decreasing circuit comprises an encoding circuit, a compression circuit, a down-sizing circuit, an image-abandoning circuit or a combination thereof, and the data amount restoring circuit comprises a decoding circuit, a decompression circuit, a size-restoring circuit, an image-interpolating circuit or a combination thereof.

4. The subtitled image generation apparatus of claim 1, wherein the control circuit is configured to, under a subtitle function enabling mode, input the image data to the image delay circuit with a frame input rate to be processed and output the image data from the image delay circuit with a frame output rate equal to the frame input rate, and configured to, under a subtitle function disabling mode, bypass the image delay circuit to output the image data directly with the frame output rate;
    wherein the control circuit is configured to, within an enabling transition time of a transition from the subtitle function disabling mode to the subtitle function enabling mode, input the image data to the image delay circuit with the frame input rate to be processed and output the image data from the image delay circuit with a first adjusted frame output rate smaller than the frame input rate;
    wherein the control circuit is configured to, within a disabling transition time of a transition from the subtitle function enabling mode to the subtitle function disabling mode, input the image data to the image delay circuit with the frame input rate to be processed and output the image data from the image delay circuit with a second adjusted frame output rate larger than the frame input rate.

5. The subtitled image generation apparatus of claim 4, wherein within the enabling transition time, the frame input rate is FIN, the first adjusted frame output rate is FOUT, a required delay time length corresponding to the generation of the subtitle image pattern from the subtitle generation circuit is DE seconds, and a length of the enabling transition time is (DE×FIN)/(FIN−FOUT).

6. A subtitled image generation method, used in a subtitled image generation apparatus, comprising:
    receiving audio data to generate a subtitle image pattern according to the audio data by a subtitle generation circuit;
    controlling a first delay path, which is in an image delay circuit and having a delay buffer circuit, by a control circuit in the image delay circuit to store and delay image data when a data amount of the image data matches a direct-writing condition;
    controlling a second delay path, which is in an image delay circuit and having a data amount decreasing circuit, the delay buffer circuit and a data amount restoring circuit, by the control circuit to decrease the data amount of the image data, to store and delay the image data and to restore the data amount of the image data when the data amount fails to match the direct-writing condition; and
    overlaying the subtitle image pattern on the image data having a corresponding timing to generate an output subtitled image by an overlaying circuit.

7. The subtitled image generation method of claim 6, further comprising:
    determining that the image data is a compressed format or an image frame size of the image data is smaller than a threshold value, to further determine that the data amount of the image data matches the direct-writing condition by the control circuit.

8. The subtitled image generation method of claim 6, wherein the data amount decreasing circuit comprises an encoding circuit, a compression circuit, a down-sizing circuit, an image-abandoning circuit or a combination thereof, and the data amount restoring circuit comprises a decoding circuit, a decompression circuit, a size-restoring circuit, an image-interpolating circuit or a combination thereof.

9. The subtitled image generation method of claim 6, wherein the control circuit is configured to, under a subtitle function enabling mode, input the image data to the image delay circuit with a frame input rate to be processed and output the image data from the image delay circuit with a frame output rate equal to the frame input rate, and configured to, under a subtitle function disabling mode, bypass the image delay circuit to output the image data directly with the frame output rate, the subtitled image generation method further comprises:
    within an enabling transition time of a transition from the subtitle function disabling mode to the subtitle function enabling mode, inputting the image data to the image delay circuit with the frame input rate to be processed and outputting the image data from the image delay circuit with a first adjusted frame output rate smaller than the frame input rate by the control circuit;

within a disabling transition time of a transition from the subtitle function enabling mode to the subtitle function disabling mode, inputting the image data to the image delay circuit with the frame input rate to be processed and outputting the image data from the image delay circuit with a second adjusted frame output rate larger than the frame input rate by the control circuit.

10. The subtitled image generation method of claim 9, wherein within the enabling transition time, the frame input rate is FIN, the first adjusted frame output rate is FOUT, a required delay time length corresponding to the generation of the subtitle image pattern from the subtitle generation circuit is DE seconds, and a length of the enabling transition time is (DE×FIN)/(FIN−FOUT).

* * * * *